United States Patent
Ushida et al.

(10) Patent No.: US 7,680,018 B2
(45) Date of Patent: Mar. 16, 2010

(54) OPTICAL RECORDING MEDIUM, AND MANUFACTURING METHOD AND MANUFACTURING DEVICE THEREOF

(75) Inventors: Tomoki Ushida, Chuo-ku (JP); Mamoru Usami, Chuo-ku (JP); Kenji Yamaga, Chuo-ku (JP)

(73) Assignee: TDK Corporation, Tokyo (JP)

( * ) Notice: Subject to any disclaimer, the term of this patent is extended or adjusted under 35 U.S.C. 154(b) by 1204 days.

(21) Appl. No.: 10/518,770

(22) PCT Filed: Jun. 6, 2003

(86) PCT No.: PCT/JP03/07237

§ 371 (c)(1),
(2), (4) Date: Dec. 21, 2004

(87) PCT Pub. No.: WO2004/006234

PCT Pub. Date: Jan. 15, 2004

(65) Prior Publication Data

US 2005/0201264 A1    Sep. 15, 2005

(30) Foreign Application Priority Data

Jul. 4, 2002 (JP) .............................. 2002-196415

(51) Int. Cl.
*G11B 7/24* (2006.01)
(52) U.S. Cl. .................................................. 369/275.1
(58) Field of Classification Search ............... 369/275.1, 369/275.5, 290.1; 428/64.1; 720/718
See application file for complete search history.

(56) References Cited

U.S. PATENT DOCUMENTS

| | | | | |
|---|---|---|---|---|
| 5,827,593 A * | 10/1998 | Maruyama et al. | ......... | 428/64.1 |
| 5,851,620 A * | 12/1998 | Nakajima et al. | ......... | 428/64.1 |
| 6,068,906 A * | 5/2000 | Sasa et al. | ................. | 428/64.2 |
| 6,507,559 B1 | 1/2003 | Iwaki | | |
| 6,743,527 B2 * | 6/2004 | Hisada et al. | ............ | 428/846.9 |
| 6,889,381 B2 * | 5/2005 | Kikuchi et al. | ............... | 720/718 |
| 2002/0085482 A1* | 7/2002 | Kikuchi et al. | .......... | 369/275.1 |
| 2003/0161255 A1* | 8/2003 | Kikuchi et al. | ............. | 369/280 |
| 2003/0199601 A1* | 10/2003 | Chang et al. | ................. | 522/71 |
| 2004/0148622 A1* | 7/2004 | Kurokawa et al. | .......... | 720/718 |

(Continued)

FOREIGN PATENT DOCUMENTS

EP   0 971 344 A1   1/2000

(Continued)

*Primary Examiner*—Joseph H Feild
*Assistant Examiner*—Henok G Heyi
(74) *Attorney, Agent, or Firm*—Oliff & Berridge, PLC

(57) ABSTRACT

An optical recording medium including a light transmitting layer having a uniform thickness formed on a substrate, in which a burr or stripping hardly occurs at the inner periphery of the light transmitting layer, and a manufacturing method and a manufacturing device of the optical recording medium are provided. An optical recording medium 10 is manufactured by a manufacturing method including: molding a disc-like shaped substrate 12 including an information recording face 12A on one side; forming a light transmitting layer 14 thinner than the substrate 12 on the information recording face 12A; forming a circular cut 16 in the light transmitting layer 14; and punching out an area inside the cut 16 by a punching tool 18 to form a center hole 14A in the light transmitting layer 14 and a center hole 20 in the substrate 12.

9 Claims, 9 Drawing Sheets

U.S. PATENT DOCUMENTS

2005/0007945 A1 * 1/2005 Usami et al. .............. 369/282

FOREIGN PATENT DOCUMENTS

| | | |
|---|---|---|
| EP | 1 152 407 A2 | 11/2001 |
| JP | A 8-31023 | 2/1996 |
| JP | A-10-283683 | 10/1998 |
| JP | A 10-289489 | 10/1998 |
| JP | A 2000-298879 | 10/2000 |
| JP | A 2000-322765 | 11/2000 |
| JP | A-2001-167472 | 6/2001 |
| JP | 2001-246643 | 9/2001 |
| JP | A 2001-344820 | 12/2001 |
| JP | A 2002-170279 | 6/2002 |
| JP | A 2002-184037 | 6/2002 |

* cited by examiner

US 7,680,018 B2

OPTICAL RECORDING MEDIUM, AND MANUFACTURING METHOD AND MANUFACTURING DEVICE THEREOF

TECHNICAL FIELD

The present invention relates to an optical recording medium which includes a light transmitting layer formed on an information recording face of a substrate to be thinner than the substrate and a center hole formed therein, and to a manufacturing method and a manufacturing device of the optical recording medium.

BACKGROUND ART

Recently, optical recording media such as a CD (Compact Disc) and a DVD (Digital Versatile Disc) are rapidly spreading as information recording media. The optical recording media are generally standardized to have an outer diameter of 120 mm and a thickness of 1.2 mm. The DVD uses a laser beam having a shorter wavelength than that for the CD as irradiation light. In addition, a numerical aperture of a lens for the irradiation light is set larger than that of the CD. As a result, the DVD is capable of recording and reproducing a larger amount of information at a higher density than the CD.

On the other hand, information recording and reproduction accuracy is more likely to lower as the wavelength of irradiation light becomes shorter and the numerical aperture of a lens becomes larger because coma aberration occurs due to inclination (warp) of a disc. Thus, the DVD includes a light transmitting layer having a half thickness of that of the CD, that is, 0.6 mm so as to ensure a margin for the inclination (warp) of the disc to keep the information recording and reproduction accuracy.

Since the light transmitting layer at a thickness of 0.6 mm alone does not offer sufficient stiffness and strength, the DVD has such a structure that two substrates, each having a thickness of 0.6 mm, are bonded to each other so that the information recording face faces inside. As a result, the DVD has a thickness of 1.2 mm, which is equal to that of the CD, to ensure the same stiffness and strength as those of the CD.

Moreover, a center hole (for example, at φ15 mm for CDs and DVDs) is generally formed in the optical recording medium so as to be used for positioning or the like in a recording and reproduction device or the like. The center hole is generally formed simultaneously with a molding step of molding a substrate in a disc-like shape.

In order to realize the recording of a larger amount of information at a higher density, there is a request for further reduction of the wavelength of irradiation light and further increase of the numerical aperture of a lens. In response to the request, an optical recording medium including a light transmitting layer at a further reduced thickness is needed. Therefore, such an optical recording medium that a light transmitting layer thinner than a substrate serving as a constructional member is formed on an information recording face of the substrate to achieve a total thickness of 1.2 mm is being developed. In order to standardize the specifications, it has been suggested to use a blue-violet laser beam having a wavelength of 405 nm as irradiation light and a numerical aperture of 0.85 and correspondingly to set a thickness of the light transmitting layer to 0.1 mm.

FIG. 18 is a perspective view showing a structure of an optical recording medium including such a thin light transmitting layer formed thereon.

An optical recording medium 100 is of single-sided type capable of recording information only on one side; it has such a structure that a light transmitting layer 104 thinner than a substrate 102 is formed on an information recording face 102A of the substrate 102.

The substrate 102 having a diameter of 120 mm and a thickness of 1.1 mm is generally formed by injection molding excellent in mass productivity. More specifically, after a resin such as polycarbonate is injected between a pair of molds, it is cooled and kept at a predetermined temperature. Then, it is formed in a disc-like shape.

The light transmitting layer 104 has a thickness of 0.1 mm, and is formed on the information recording face 102A of the substrate 102 by spin coating or the like. Specifically, an ultraviolet curable or electron beam curable, light transmitting resin is supplied to the vicinity of the center of the information recording face 102A. Then, the substrate 102 is rotated so as to force the supplied resin outward in radial direction by centrifugal force to allow it to flow. In this manner, the resin is spread over the entire surface of the information recording face 102A. After the spread, the resin is irradiated with an ultraviolet ray, an electron beam or the like so as to be cured, thereby completing a light transmitting layer formation step. In the case of dual-sided type capable of recording information on both sides of a substrate, a thickness of the substrate is set to 1.0 mm and a light transmitting layer at a thickness of 0.1 mm is laid on each of the faces of the substrate. Alternatively, two substrates, each having a thickness of 0.5 mm and including a light transmitting layer at a thickness of 0.1 mm deposited thereon, may be prepared and bonded to each other.

However, if the spin coating is applied to the substrate having a center hole formed therein, a thickness of the spread resin is likely to be nonuniform, sometimes resulting in difficulty in information recording and reproduction at a high density.

Although the reason for a nonuniform thickness is not exactly known, it is generally believed as follows. When a resin is supplied to the surroundings of a center hole, centrifugal force is immediately exerted on the resin by the rotation of a substrate. As a result, the resin is spread outward from the position of supply over the entire substrate while flowing outward in a radial direction from the position of supply. Meanwhile, the centrifugal force is still exerted. Therefore, a thickness of an inner part and that of an outer part do not become equal to each other, providing such a thickness profile that a thickness becomes smaller inward and becomes larger outward. It is conceivable to additionally supply a resin so as to compensate for the reduction in thickness. However, since highly accurate control in accordance with a variation in thickness is required, such control is difficult in practice.

On the other hand, with the use of a substrate without a center hole, a resin can be supplied to the center of the substrate or supplied radially inward as compared with the case of a substrate with a center hole. Therefore, the centrifugal force can be prevented from being immediately exerted on the supplied resin. In this case, since the center of the substrate serves as a resin reservoir to additionally supply the resin onto the information recording face in a continuous manner, the resin can be spread at a uniform thickness. In this case, after the spread resin is cured, a center hole is formed by punching the light transmitting layer 104 and the substrate 102 by a punching tool 106 as shown in FIG. 19. The reference numeral 102A in the drawing denotes a circular concave portion formed on a face of the substrate 102, which is opposite to the information recording face 102A, so as to facilitate the punching.

However, since the light transmitting layer 104 is extremely thin at a thickness of about 0.1 mm, there arises a problem in that a burr is generated on its inner periphery as shown in FIG. 20 or the inner periphery is stripped away from the information recording face 102A in some cases when the light transmitting layer is punched by the punching tool 106. Moreover, even if no burr or stripping occurs in a manufacturing step, a finger or the like touches the inner periphery of the light transmitting layer when the finger or the like is inserted into the center hole during the use, sometimes resulting in stripping of the light transmitting layer.

DISCLOSURE OF THE INVENTION

In view of the foregoing problems, various exemplary embodiments of this invention provide an optical recording medium including a light transmitting layer formed at a uniform thickness on a substrate, in which a burr or stripping hardly occurs on an inner periphery of the light transmitting layer, and a manufacturing method and a manufacturing device of the optical recording medium.

In order to achieve the above object, as a result of a keen examination, the inventors of the present invention found that the formation of a light transmitting layer with a center hole at a uniform thickness on a circular substrate can be ensured by forming a circular cut in the light transmitting layer and then punching out at least a part of an area inside the cut by a punching tool to form center holes through the light transmitting layer and the substrate.

Specifically, the above-described object can be achieved by the following various exemplary embodiments of the present invention.

(1) An optical recording medium comprising:
a disc-like shaped substrate including a center hole formed therein and an information recording face at least on one side; and
a light transmitting layer formed on the information recording face so as to be thinner than the substrate, the light transmitting layer including a center hole at a larger inner diameter than that of the center hole formed in the substrate.

(2) The optical recording medium according to (1), wherein
an annular protrusion projecting in a thickness direction is formed around the center hole in the substrate, and the center hole having a larger inner diameter than an outer diameter of the annular protrusion is formed in the light transmitting layer.

(3) The optical recording medium according to (2), wherein
the amount of projection of the annular protrusion is approximately equal to a thickness of the light transmitting layer.

(4) A method for manufacturing an optical recording medium, comprising:
a molding step of molding a disc-like shaped substrate including an information recording face at least on one side;
a light transmitting layer formation step of forming a light transmitting layer thinner than the substrate on the information recording face;
a cutting step of forming a circular cut in the light transmitting layer; and
a punching step of punching out at least a part of an area inside the cut by a punching tool to form center holes in the light transmitting layer and the substrate.

(5) The method for manufacturing an optical recording medium according to (4), wherein
the cut in the light transmitting layer is formed at a larger diameter than an inner diameter of the center hole in the substrate, and the area inside the cut is pressurized in a thickness direction by the punching tool to divide the light transmitting layer at the cut and to punch the light transmitting layer and the substrate, thereby forming the center hole at a larger inner diameter than that of the center hole in the substrate in the light transmitting layer.

(6). The method for manufacturing an optical recording medium according to (5), wherein
a circular protrusion at a larger outer diameter than the inner diameter of the center hole in the substrate is formed on the information recording face at the molding step, the cut is formed in the light transmitting layer along an outer side of an outer circumference of the circular protrusion, and the substrate is punched by the punching tool to leave an outer periphery of the circular protrusion to form an annular protrusion around the center hole in the substrate as well as to form the center hole having a larger inner diameter than an outer diameter of the annular protrusion in the light transmitting layer.

(7). The method for manufacturing an optical recording medium according to any one of (4) to (6), wherein
a resin having fluidity is supplied to the vicinity of a center of the substrate while the substrate is rotated to allow the resin to flow outward in a radial direction by centrifugal force for spread, thereby forming the light transmitting layer at the light transmitting layer formation step.

(8) The method for manufacturing an optical recording medium according to (7), wherein
the light transmitting layer is made of a radiation curable resin, a radiation ray is radiated so that the light transmitting layer is semi-cured at the light transmitting layer formation step, and a reirradiation step of radiating a radiation ray again to the semi-cured light transmitting layer so as to completely cure the light transmitting layer is provided after the cutting step.

(9) A manufacturing device of an optical recording medium characterized by including: molding device for molding a disc-like shaped substrate having an information recording face at least on one side; light transmitting layer formation device for forming a light transmitting layer thinner than the substrate on the information recording face; cutting device for forming a circular cut in the light transmitting layer; and punching device for punching out at least a part of an area inside the cut to form center holes through the light transmitting layer and the substrate.

(10) The optical recording medium according to (2), wherein
the amount of projection of the annular protrusion is larger than a thickness of the light transmitting layer.

An inner diameter of the center hole in the light transmitting layer is not always equal to an outer diameter of the punching tool for punching the light transmitting layer. For example, in the case where a cut at a larger diameter than the inner diameter of the center hole of the substrate is to be formed as mentioned in the above (5), a punching tool having an outer diameter equal to the inner side of the center hole to be formed through the substrate is used. The light transmitting layer is pressurized by the punching tool so as to be divided at the cut which is situated radially outside of an outer circumference of the punching tool. The part which lies radially inside of the cut is further pushed out together with the part which lies radially outside of the punching tool by the punching tool in a thickness direction so as to be removed from the optical recording medium. Specifically, the center hole in the light transmitting layer is formed to have a larger inner diameter than the outer diameter of the punching tool. On the other hand, if the cut is formed at a diameter equal to the inner diameter of the center hole in the substrate, the inner diameter of the center hole in the light transmitting layer is identical with the outer diameter of the punching tool.

The term "radiation ray" generally means electromagnetic waves and particle beams such as a γ-ray, an X-ray, and an α-ray, which are released with the decay of a radioactive element. Throughout this specification, however, the term "radiation ray" is used to generically mean electromagnetic waves and particles beams, for example, an ultraviolet ray, an electron beam or the like, which have a property of curing a specific resin in a flowing state.

BEST MODE FOR CARRYING OUT THE INVENTION

Various exemplary embodiments of this invention will be hereinafter described in detail with reference to the drawings.

Figure 1:
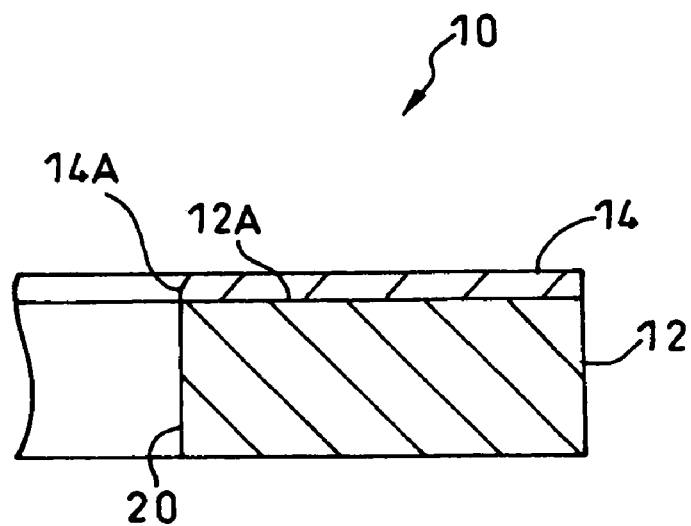
FIG. 1 is a sectional view showing a structure of an optical recording medium according to a first exemplary embodiment of the present invention.
Figure 2:
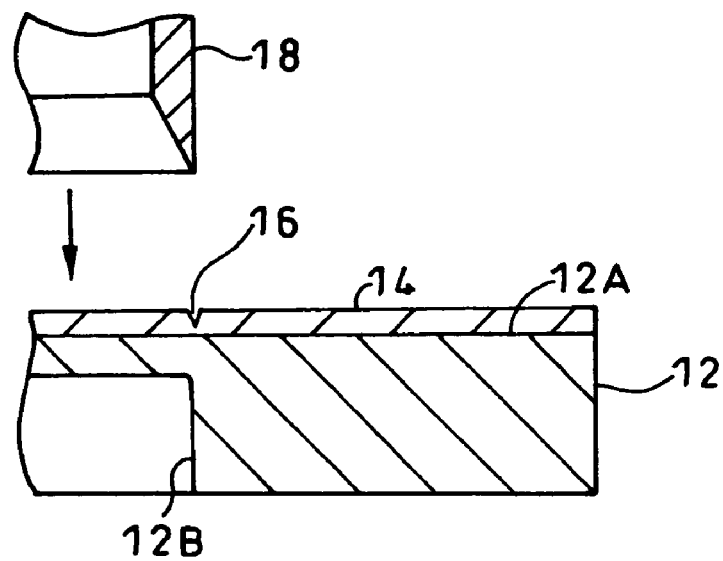
FIG. 2 is a sectional view showing a punching step of the optical recording medium.

FIG. 1 is a sectional view of an optical recording medium 10 according to this exemplary embodiment. FIG. 2 is a sectional view showing a punching step in manufacture of the optical recording medium 10.

A manufacturing method of the optical recording medium 10 is characterized by including: a molding step of molding a disc-like shaped substrate 12 including an information recording face 12A on one side; a light transmitting layer formation step of forming a light transmitting layer 14 thinner than the substrate 12 on the information recording face 12A; a cutting step of forming a circular cut 16 in the light transmitting layer 14; and a punching step of punching out an area inside the cut 16 by a punching tool 18 to form a center hole 14A through the light transmitting layer 14 and a center hole 20 through the substrate 12.

Since the other steps are the same as those of a conventional manufacturing method of an optical recording medium, the description is herein appropriately omitted.

First, the step of molding the substrate 12 will be described.

Figure 3:
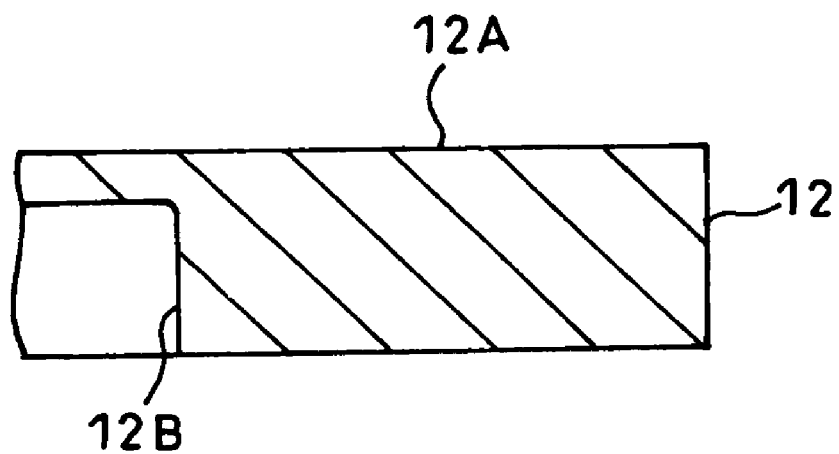
FIG. 3 is a sectional view showing a molding step of a substrate of the optical recording medium.

After a resin such as a polycarbonate, which is preheated to be molten, is injected between a pair of molds (the illustration herein omitted), it is cooled and kept at a predetermined formation temperature. Then, it is formed in a disc-like shape with a diameter of 120 mm and a thickness of 1.1 mm without a center hole on the information recording face 12A. At this step, predetermined fine concavity and convexity or the like (the illustration herein omitted) are formed on the information recording face 12A by a stamper (the illustration herein omitted) (see FIG. 3). In place of polycarbonate, a resin such as acrylic or epoxy may be used. The reference numeral 12B in the drawing denotes a circular concave portion formed on a face opposite to the information recording face 12A so as to facilitate the punching of the substrate 12 at a punching step described below. An inner diameter of the circular concave portion is formed to be equal to an inner diameter of the center hole 20 (formed later). After molding the substrate 12 in this manner, the substrate 12 is taken out of the molds and then is cooled at a room temperature. At a subsequent step, a functional layer is formed on the information recording face 12A.

Herein, a formation step of the functional layer will be briefly described. Since the functional layer is even thinner than the light transmitting layer 14 and is not considered to be particularly necessary for understanding of the present invention, the illustration of the functional layer is herein omitted. If the optical recording medium 10 is of read only type, a reflective layer is formed on the information recording face 12A as a functional layer. On the other hand, the optical recoding medium 10 is of writable and readable type, a reflective layer and a recording layer are formed on the information recording face 12A in this order as functional layers. The reflective layer is made of Al, Ag, Au, or the like, and is formed by sputtering, vapor deposition or the like. The recording layer is made of a phase-change material, a coloring material, a photomagnetic material or the like, and is formed by sputtering, spin coating, dipping, vapor deposition or the like.

Next, the light transmitting layer formation step will be described.

The light transmitting layer 14 is formed on the functional layer by spin coating.

Figure 4:
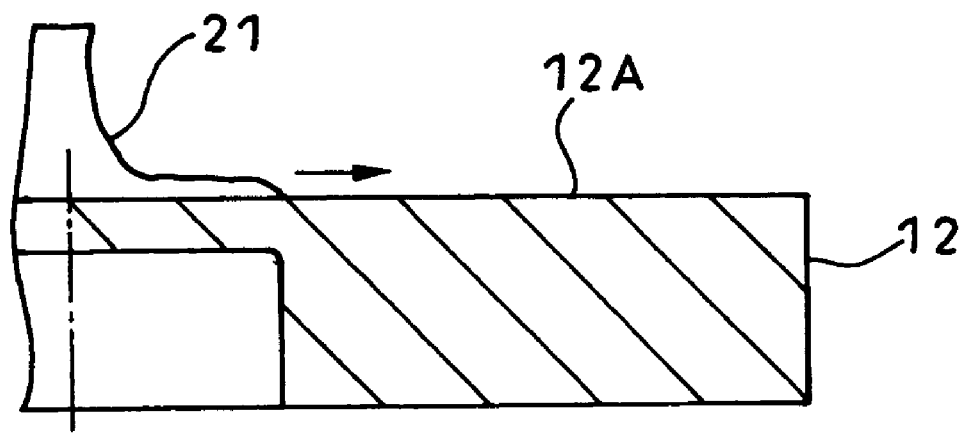
FIG. 4 is a sectional view showing the spread of a resin at a formation step of an optical recording layer of the optical recording medium.
Figure 5:
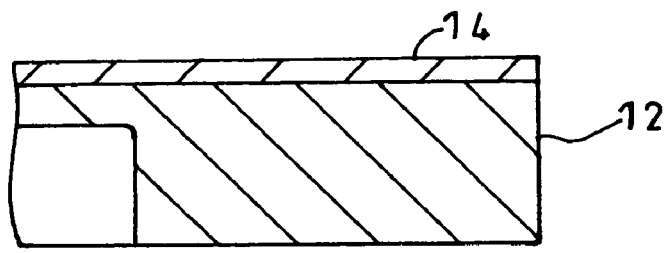
FIG. 5 is a sectional view showing the optical recording layer formed at the formation step.

First, the substrate 12 is horizontally placed and then is rotationally driven. As shown in FIG. 4, a predetermined amount of an ultraviolet curable resin 21 is supplied from above to the center of the substrate 12. Centrifugal force in proportion to a distance from the center of the substrate 12 is exerted on the resin 21, so that the resin 21 is forced outward in a radial direction to be spread over the entire information recording face 12A. In this case, since the centrifugal force is scarcely exerted on the resin 21 in the vicinity of the center, the center of the substrate 12 serves as a resin reservoir to additionally supply the resin 21 onto the information recording face 12A in a continuous manner. As a result, the resin 21 is spread at a uniform thickness over the entire information recording face 12A as shown in FIG. 5. After being spread, the resin 21 is irradiated with an ultraviolet ray so as to be cured, thereby completing the light transmitting layer formation step.

Next, the cutting step will be described.

Figure 6:
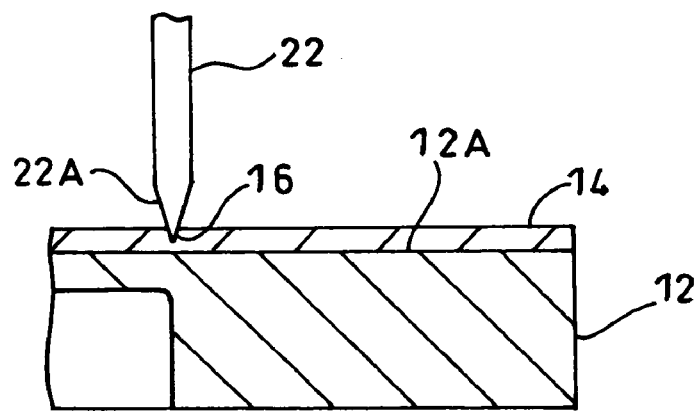
FIG. 6 is a sectional view showing a cutting step of the optical recording medium.
Figure 7:
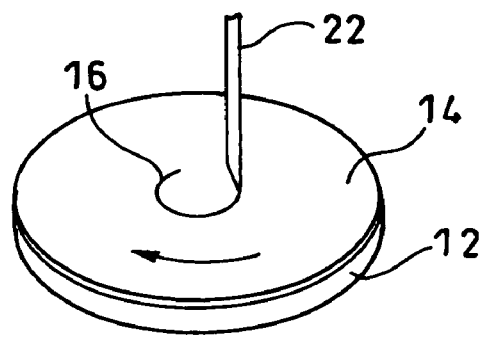
FIG. 7 is a perspective view of the cutting step of the optical recording medium.

First, as shown in FIG. 6, a blade 22A of a tool 22 is abutted on the light transmitting layer 14 at a predetermined position as shown in FIG. 6. Specifically, the blade 22A is abutted at a position corresponding to an inner circumference of the center hole 20 to be formed later. When the light transmitting layer 14 is rotated with the substrate 12 in this state as shown in FIG. 7, a circular cut 16 is concentrically formed in the light transmitting layer 14. A depth of the cut 16 may be smaller than a thickness of the light transmitting layer 14 or may be equal to the thickness of the light transmitting layer 14. Alternatively, the depth of the cut may be larger than the thickness of the light transmitting layer 14 so that the cut reaches the substrate 12.

Next, the punching step will be described.

First, the circular punching tool 18 having an outer diameter equal to the inner diameter of the center hole 20 to be formed is prepared. As shown in FIG. 2, the punching tool 18 is placed to face concentrically the light transmitting layer 14 so that the outer circumference of the punching tool 18 is superposed on the cut 16 as shown in FIG. 2. Next, the punching tool 18 is forced in a direction of the light transmitting layer 14 so as to punch the light transmitting layer 14 and the substrate 12 by the punching tool 18. In this manner, the center hole 14A is formed through the light transmitting layer 14 while the center hole 20 is formed through the substrate 12 as shown in FIG. 1. The center hole 14A has an inner diameter equal to that of the center hole 20.

In this case, prior to the punching step, the cut is formed in the light transmitting layer by the cutting step. At the same time, a stress concentrates on the cut 16 in the light transmitting layer 14 so that the light transmitting layer 14 is divided exactly at the cut 16. Therefore, a burr is not generated on the inner periphery of the light transmitting layer 14 or the inner periphery is not stripped away from the information recording face 12A.

In the above-described manner, the optical recording medium 10 is completed. Since the optical recording medium 10 includes the light transmitting layer 14 at a uniform thickness, it can precisely record and reproduce information at a high density. In addition, it is ensured that the inner periphery is in close contact with the information recording face 12A and therefore is hardly stripped away, providing high reliability.

The center hole 20 in the substrate 12 and the center hole 14A in the light transmitting layer 14 are circular and formed concentric with the optical recording medium 10. However, it is sufficient that the accuracy of roundness and the accuracy of concentricity of the center holes 20 and 14A are within the dimensional tolerances required for the optical recording medium. It is apparent that a circle slightly out of a strict round shape or slight eccentricity from a strict concentric state is allowable.

Next, a second exemplary embodiment of the present invention will be described.

Figure 8:
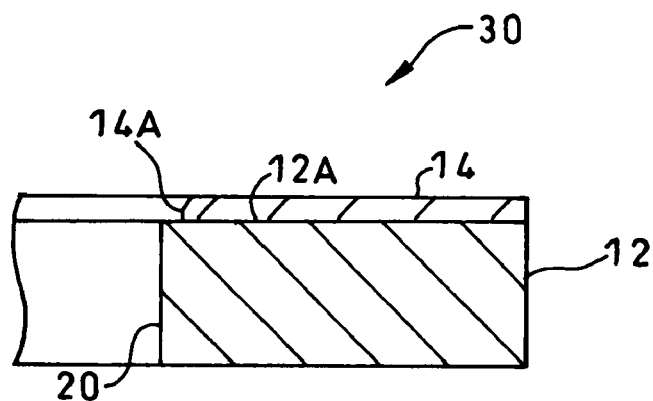
FIG. 8 is a sectional view showing a structure of an optical recording medium according to a second exemplary embodiment of the present invention.

FIG. 8 is a sectional view showing a structure of an optical recording medium 30 according to this second exemplary embodiment.

The optical recording medium 30 is characterized by including the center hole 14A having a larger inner diameter than that of the center hole 20 through the substrate 12, which is formed through the light transmitting layer 14.

Figure 9:
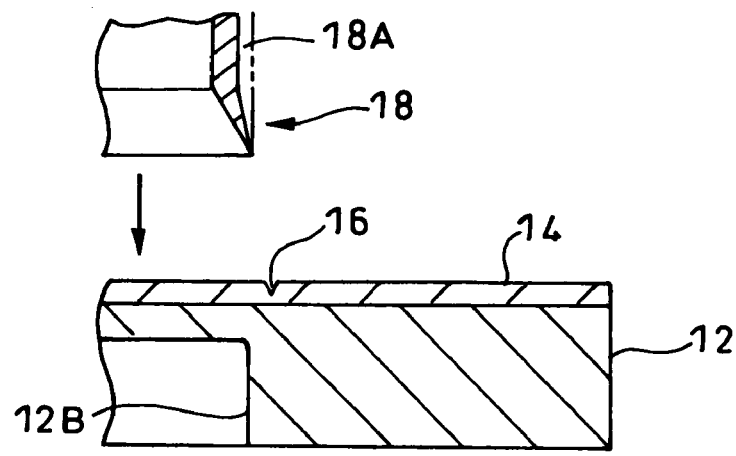
FIG. 9 is a sectional view showing a punching step of the optical recording medium.

A method of manufacturing the optical recording medium 30 is characterized as follows. As shown in FIG. 9, the cut 16 in the light transmitting layer 14 is formed to have a larger diameter than the inner diameter of the center hole 20 through the substrate 12. An area inside the cut 16 is pressurized by the punching tool 18 in a thickness direction so as to divide the light transmitting layer 14 at the cut 16 as well as to punch the light transmitting layer 14 and the substrate 12. As a result, the center hole 14A having a larger inner diameter than that of the center hole 20 through the substrate 12 is formed through the light transmitting layer 14.

Since the other parts are the same as those of the optical recording medium 10 and the method of manufacturing the optical recording medium 10 described above, the description thereof is appropriately omitted.

First, a cutting step will be described.

Figure 10:
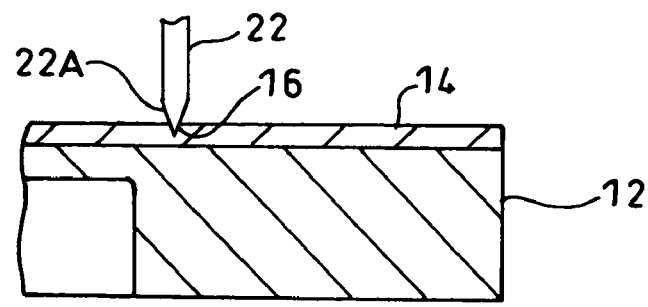
FIG. 10 is a sectional view showing a cutting step of the optical recording medium.

As shown in FIG. 10, the blade 22A of the tool 22 is abutted on the light transmitting layer 14 at a position situated slightly outward in a radial direction from the position corresponding to the inner circumference of the center hole 20 to be formed later through the substrate 12. In this state, the light transmitting layer 14 is rotated with the substrate 12. As a result, the circular cut 16 is concentrically formed in the light transmitting layer 14 to have a slightly larger diameter than the inner diameter of the center hole 20 to be formed through the substrate 12 later.

Next, a punching step will be described.

As shown in FIG. 9, the punching tool 18 is placed to face the light transmitting layer 14 so that the outer circumference of the punching tool 18 is superposed on the inner circumference of the center hole 20 to be formed through the substrate 12. Next, the punching tool 18 is forced toward the light transmitting layer 14 so as to punch the light transmitting layer 14 and the substrate 12 by the punching tool 18, thereby forming the center hole 20 as shown in FIG. 8 through the substrate 12.

In this case, the punching tool 18 pressurizes an area inside the cut 16 in the light transmitting layer 14 toward the substrate 12 so as to divide the light transmitting layer 14 at the cut 16. The area inside the cut 16 is pushed toward the substrate 12 so as to be punched out.

The diameter of the cut 16 in the light transmitting layer 14 is larger than the inner diameter of the center hole 20 through the substrate 12. The part inside the cut 16 is pushed out in the thickness direction by the punching tool 18 so as to form the center hole 20 through the substrate 12 as well as to be removed through the center hole 20. In addition, a concave portion (recess) 18A allowing the light transmitting layer (in a ring shape), which is situated inside the cut and outside the punching tool, to get therein may be provided on the outer peripheral face of the blade of the punching tool so as to efficiently remove the corresponding part of the light transmitting layer.

As a result, the center hole 14A having a larger inner diameter than that of the center hole 20 in the substrate 12 is formed in the light transmitting layer 14.

Also in this case, the cut is formed in the light transmitting layer by the cutting step prior to the punching step. In addition, a stress concentrates on the cut 16 in the light transmitting layer 14, so that the light transmitting layer 14 is divided exactly at the cut 16. Therefore, a burr is not generated on the inner periphery of the light transmitting layer 14 or the inner periphery is not stripped away from the information recording face 12A.

By increasing the size of the center hole 14A in the light transmitting layer 14 to be larger than the center hole 20 in the substrate 12 in this manner, a finger hardly directly touches the inner periphery of the light transmitting layer 14 even if the finger is inserted in the center hole 20. As a result, the light transmitting layer 14 can also be prevented from being stripped away due to manual handling.

In a similar manner, even when the optical recording medium 30 is to be loaded in an information recording device, an information reproducing device or the like, a component for positioning or the like does not come into contact with the inner periphery of the light transmitting layer 14. Therefore, the light transmitting layer 14 can be prevented from being stripped away when it is used in these devices.

Moreover, although there is a difference between the inner diameter of the center hole 20 in the substrate 12 and the inner diameter of the center hole 14A in the light transmitting layer 14, the formation of the two center holes 20 and 14A is made possible by single punching with the punching tool 18 owing to the formation of the cut 16, providing good production efficiency.

As in the first exemplary embodiment described above, it is sufficient that the accuracy of roundness of the center hole 20 through the substrate 12 and the accuracy of concentricity with the optical recording medium 30 are within the dimensional tolerances required for the optical recording medium 30. It is apparent that a circle slightly out of a strict round shape or slight eccentricity from a strict concentric state is allowable.

Any center hole 14A in the light transmitting layer 14 is allowed as long as its inner circumference is situated radially outside of the center hole 20 in the substrate 12. The accuracy of roundness and the accuracy of concentricity with the optical recording medium 30 required for the center hole 14A in the light transmitting layer 14 are lower than those required for the center hole 20 in the substrate 12, and therefore the center hole 14A is not necessarily required to be concentric with the center hole 20 through the substrate 12. Specifically, the accuracy required for the formation of the cut 16 is low. Correspondingly, a cutting operation is easy. Moreover, it is sufficient that the punching tool 18 punches out the area inside the cut 16 so as to coincide with the center hole 20 to be formed in the substrate 12. It is not always necessary for the punching tool 18 and the cut 16 to be concentric with each other in punching.

Next, a third exemplary embodiment of the present invention will be described.

Figure 11:
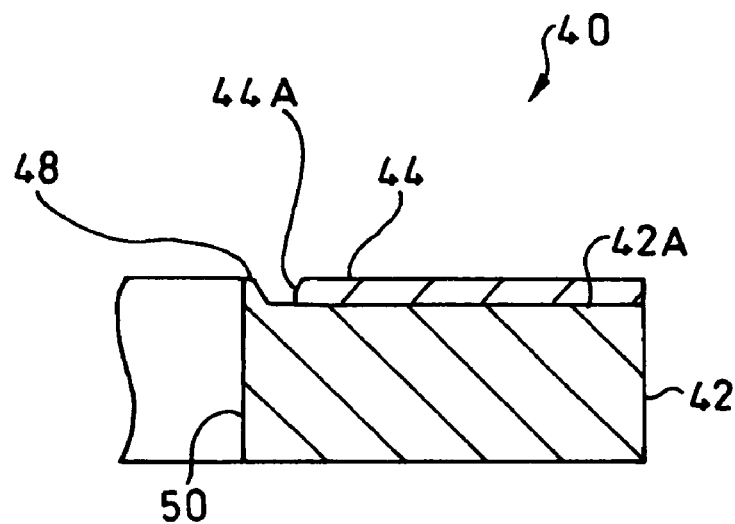
FIG. 11 is a sectional view showing a structure of an optical recording medium according to a third exemplary embodiment of the present invention.

FIG. 11 is a sectional view showing a structure of an optical recording medium 40 according to this third exemplary embodiment.

The optical recording medium 40 is characterized by including: an annular protrusion 48 projecting in the thickness direction formed around a center hole 50 through a substrate 42; and a center hole 44A having a larger inner diameter than an outer diameter of the annular protrusion 48, which is formed through a light transmitting layer 44.

Figure 12:
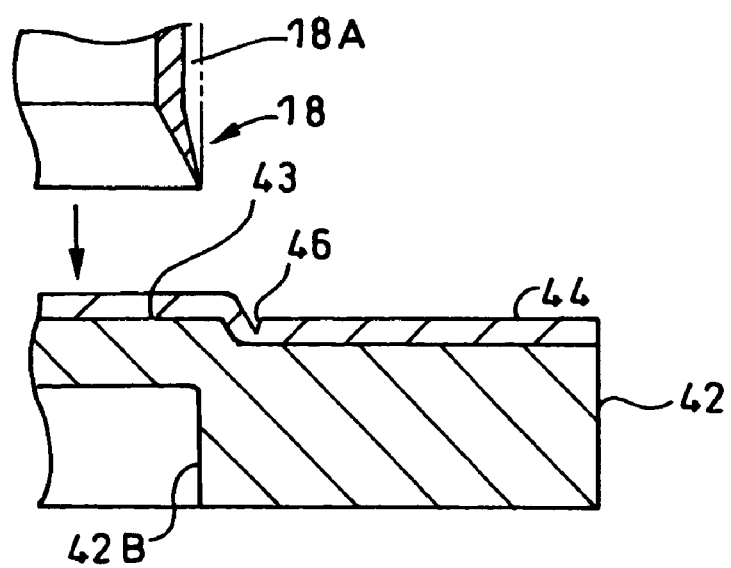
FIG. 12 is a sectional view showing a punching step of the optical recording medium.

Moreover, as shown in FIG. 12, a method of manufacturing the optical recording medium 40 is characterized as follows. A circular protrusion 43 having a larger outer diameter than an inner diameter of the center hole 50 to be formed through the substrate 42 later at a molding step is formed on an information recording face 42A. A cut 46 is formed in the light transmitting layer 44 along the outer side of an outer circumference of the circular protrusion 43. The substrate 42 is punched by the punching tool 18 so as to leave an outer periphery of the circular protrusion 43, thereby forming the center hole 50 through the substrate 42 and the annular protrusion 48 around the center hole 50. At the same time, the center hole 44A having a larger inner diameter than the outer diameter of the annular protrusion 48 is formed through the light transmitting layer 44.

Since the other parts are the same as those of the optical recording media 10 and 30 and the manufacturing methods of the optical recording media described above, the description thereof will be herein appropriately omitted.

First, a molding step, of the substrate 42 will be described.

A circular concave portion is provided in the center of one of a pair of molds (the illustration herein omitted) for molding the substrate 42, the mold serving to form the information recording face 42A.

Figure 13:
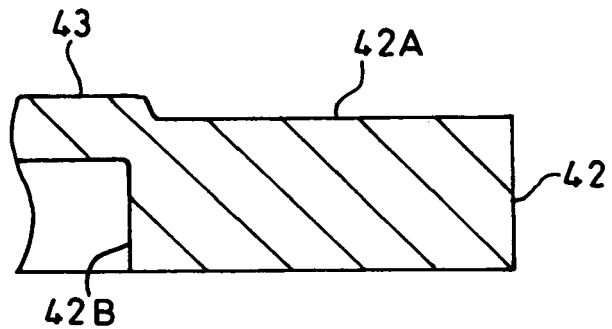
FIG. 13 is a sectional view showing a molding step of a substrate of the optical recording medium.

In this manner, the circular protrusion 43 as shown in FIG. 13 is formed on the information recording face 42A side of the substrate 42. The circular protrusion 43 is formed concentric so as to have a slightly larger outer diameter than the inner diameter of the center hole 50 to be formed later. The substrate 42 is formed so that a thickness of the part other than the circular protrusion 43 is 1.1 mm and the amount of projection of the circular protrusion 43 is 0.1 mm. A circular protrusion is provided in the center of the mold for forming a face of the substrate 42, which is opposite to the information recording face 42A, so as to form concentrically the circular concave portion 42B on the side of the substrate 42 opposite to the information recording face 42A. The circular concave portion 42B is formed so as to have an inner diameter equal to that of the center hole 50 to be formed later.

Next, a formation step of the light transmitting layer 44 will be described.

Figure 14:
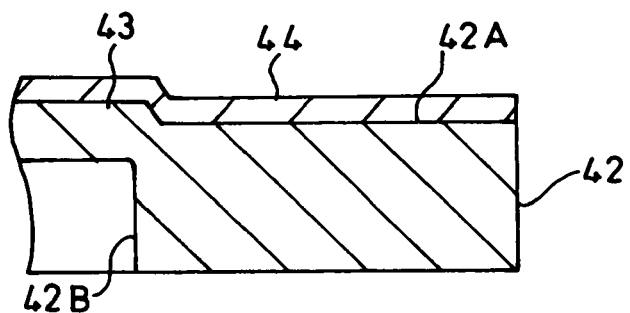
FIG. 14 is a sectional view showing a formation step of an optical recording layer of the optical recording medium.

First, the substrate 42 is placed horizontal and is then rotationally driven. A predetermined amount of an ultraviolet curable resin is supplied from above to the center of the substrate 42. Centrifugal force in proportion to a distance from the center of the substrate 42 is exerted on the supplied resin to force the resin outward in the radial direction, so that the resin is spread over the entire information recording face 42A. At this time, since the centrifugal force is scarcely exerted on the resin in the vicinity of the center of rotation, the center of the substrate 42 serves as a resin reservoir to additionally supply the resin on the information recording face 42A in a continuous manner. As a result, the resin is spread at a uniform thickness over the entire information recording face 42A as shown in FIG. 14. Since the resin is spread at a uniform thickness even on the circular protrusion 43, the light transmitting layer 44 is formed in a stepwise shape. After being spread, the resin is irradiated with an ultraviolet ray so as to be cured, thereby completing the formation step of the light transmitting layer 44.

Next, a cutting step will be described.

Figure 15:
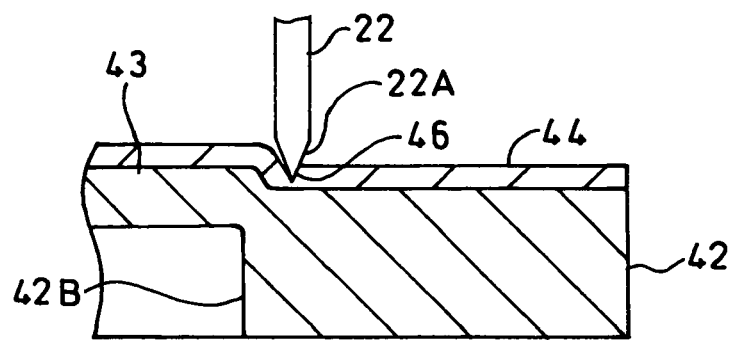
FIG. 15 is a sectional view showing a cutting step of the optical recording medium.

As shown FIG. 15, the cut 46 is formed in the vicinity of a step on the light transmitting layer 44 along the outer side of the outer circumference of the circular protrusion 43. Since a tool for forming the cut 46 or the like is the same as that in the above-described first and second exemplary embodiments, the description thereof is herein omitted.

Next, a punching step will be described.

First, as shown in FIG. 12, the punching tool 18 is placed to face the light transmitting layer 44 so that the outer circumference of the punching tool 18 is superposed on the inner circumference of the center hole 50 to be formed. Next, the punching tool 18 is forced toward the light transmitting layer 44 so as to punch out the circular protrusion 43 leaving its outer periphery, thereby forming the center hole 50 as shown in FIG. 11. At the same time, a part of the circular protrusion 43 is left so as to form the annular protrusion 48 around the center hole 50.

In this case, the punching tool 18 pressurizes the light transmitting layer 44 on the circular protrusion 43 in the thickness direction so as to divide the light transmitting layer 44 at the cut 46. The area inside the cut 46 is pushed toward the substrate 42 so as to be punched out. As a result, the center hole 44A having a larger inner diameter than the outer diameter of the annular protrusion 48 is formed through the light transmitting layer 44.

Also in this case, the cut is formed in the light transmitting layer by the cutting step prior to the punching step. In addition, a stress concentrates on the cut 46 in the light transmitting layer 44, so that the light transmitting layer 44 is divided exactly at the cut 46. Therefore, a burr is not generated on the inner periphery of the light transmitting layer 44 or the inner periphery is not stripped away from the information recording face 42A.

Specifically, as the optical recording media 10 and 30, the optical recording medium 40 includes the light transmitting layer 44 at a uniform thickness and therefore is capable of precisely recording and reproducing information. In addition, it is ensured that the inner periphery of the light transmitting layer 44 is in close contact with the information recording face 42A so as to be hardly stripped away therefrom, providing high reliability.

Furthermore, since the annular protrusion 48 is formed inside the inner periphery of the light transmitting layer 44, a finger hardly directly touches the inner periphery of the light transmitting layer 44 even if the finger is inserted in the center hole 50. As a result, the light transmitting layer 44 can also be prevented from being stripped away due to manual handling.

In a similar manner, even when the optical recording medium 40 is to be loaded in an information recording device, an information reproducing device or the like, a component for positioning or the like does not come into contact with the inner periphery of the light transmitting layer 44. Therefore, the light transmitting layer 44 can be prevented from being stripped away when it is used in these devices.

Specifically, since the inner periphery of the light transmitting layer 44 is protected by the annular protrusion 48, the prevention of stripping of the light transmitting layer 44 can be ensured.

Moreover, although there is a difference between the inner diameter of the center hole 50 in the substrate 42 and the inner diameter of the center hole 44A in the light transmitting layer 44, the formation of the two center holes 50 and 44A and the annular protrusion 48 is allowed by single punching with the punching tool 18 owing to the formation of the cut 46, providing good production efficiency.

It is sufficient that the annular protrusion 48 projects in the thickness direction around the center hole 50 through the substrate 42; its radial width is not always required to be constant. Specifically, the outer circumference of the annular protrusion 48 is not required to be a circle concentric with the optical recording medium 40. Therefore, the circular protrusion 43 may be formed slightly eccentric at the molding step of the substrate 42.

Moreover, it is sufficient that the center hole 44A in the light transmitting layer 44 is formed so that the inner circumference is situated outside of the annular protrusion 48 in the radial direction; the center hole 44A is not required to be a circle concentric with the optical recording medium 40. Therefore, the cut may be formed so as to be slightly eccentric in the light-transmitting layer 44 at the cutting step.

Although the optical recording medium is described as single-sided type capable of recording only on one side in the above-described first to third exemplary embodiments, the present invention is not limited thereto. It is apparent that the present invention is also applicable to a double-sided recording type optical recording medium capable of recording information on its both sides. In this case, the thickness of the substrate is set to 1.0 mm, and a light transmitting layer at a thickness of 0.1 mm is formed on each side of the substrate. As a result, an optical recording medium having a thickness of 1.2 mm can be obtained. Alternatively, two substrates, each having a thickness of 0.5 mm and including a light transmitting layer at a thickness of 0.1 mm formed thereon, may be prepared and bonded to each other. Furthermore, the present invention is also applicable to an optical recording medium including a plurality of recording layers formed on either one of or both the surfaces.

After the resin spread at the formation step of the light transmitting layers 14 and 44 is irradiated with an ultraviolet ray so as to be completely cured, the cuts 16 and 46 are formed in the light transmitting layers 14 and 44 in the above-described first to third exemplary embodiments. However, the present invention is not limited thereto. The spread resin may be semi-cured by appropriately controlling irradiation time of the ultraviolet ray or the like at the formation step of the light transmitting layers 14 and 44. After the formation of the cuts 16 and 46, the spread resin is irradiated with the ultraviolet ray again so as to be completely cured.

In the case where the cuts 16 and 46 are formed by abutting a blade on the light transmitting layers 14 and 44, the light transmitting layers 14 and 44 are slightly pushed away in a thickness direction of the blade. However, if the light transmitting layers 14 and 44 are semi-cured, they can easily follow and be deformed in the thickness direction of the blade, thereby ensuring the prevention of the stripping from the substrates 12 and 42.

It is preferred that the degree of semi-curing of the spread resin be hard enough for the resin not to be adhered to the blade and be soft enough for the resin to easily follow the cut of the blade to easily follow and be deformed in the thickness direction of the blade so as not to be stripped away from a boundary face with the substrate.

In order to ensure that the area inside the cut in the light transmitting layer is punched out so as to be removed, it is preferred to perfectly cure the light transmitting layer prior to the punching step.

Although the light transmitting layer is an ultraviolet curable resin in the first to third exemplary embodiments described above, a resin having a property of being cured by other kinds of radiation ray such as an electron beam curable resin may be used.

Although the light transmitting layer is formed on the substrate by spin coating in the above-described first to third exemplary embodiments, the present invention is not limited thereto. For example, a light transmitting layer may be formed on a substrate by bonding a light transmitting sheet-like material to the substrate. Further alternatively, a light transmitting layer may be formed on a substrate by other methods such as a doctor blade method.

Figure 16:
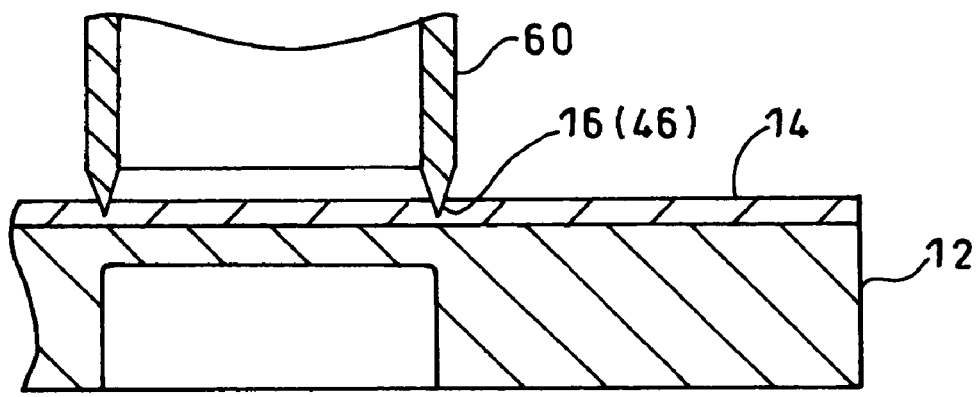
FIG. 16 is a sectional view showing a cutting step according to another exemplary embodiment of the present invention.

Although the tool is abutted on the light transmitting layer and the light transmitting layer is rotated with the substrate to form the cut in the first to third exemplary embodiments described above, the present invention is not limited thereto. The cut may be formed in the light transmitting layer by moving the tool on a circular orbit while the substrate and the light transmitting layer are fixed. Alternatively, instead of the tool, a laser beam may be used to form the cut. Further alternatively, for example, as shown in FIG. 16, the cut 16 (46) may be formed by pressing an end of a cylindrical tool 60 against the light transmitting layer so as to be in contact therewith.

Figure 17:
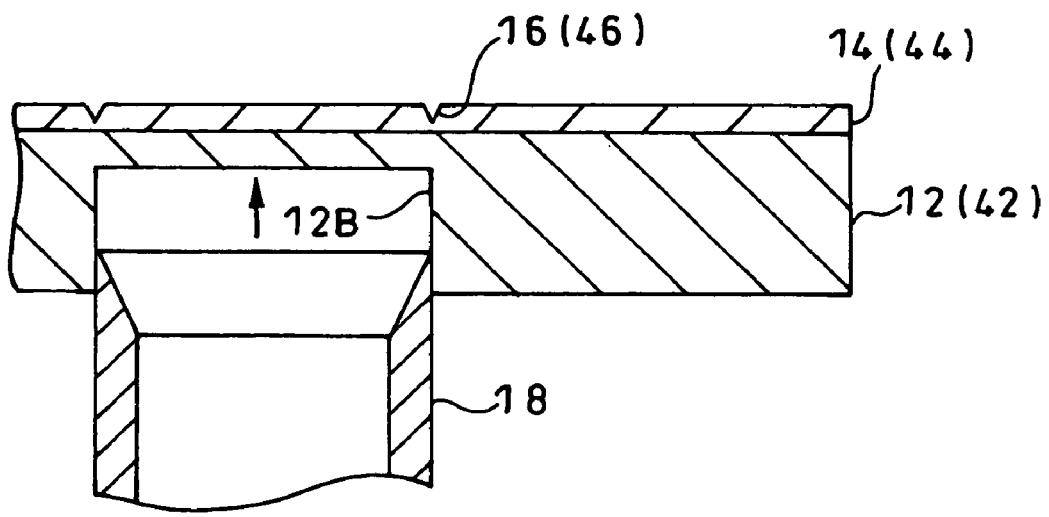
FIG. 17 is a sectional view showing a punching step according to another exemplary embodiment of the present invention.
Figure 18:
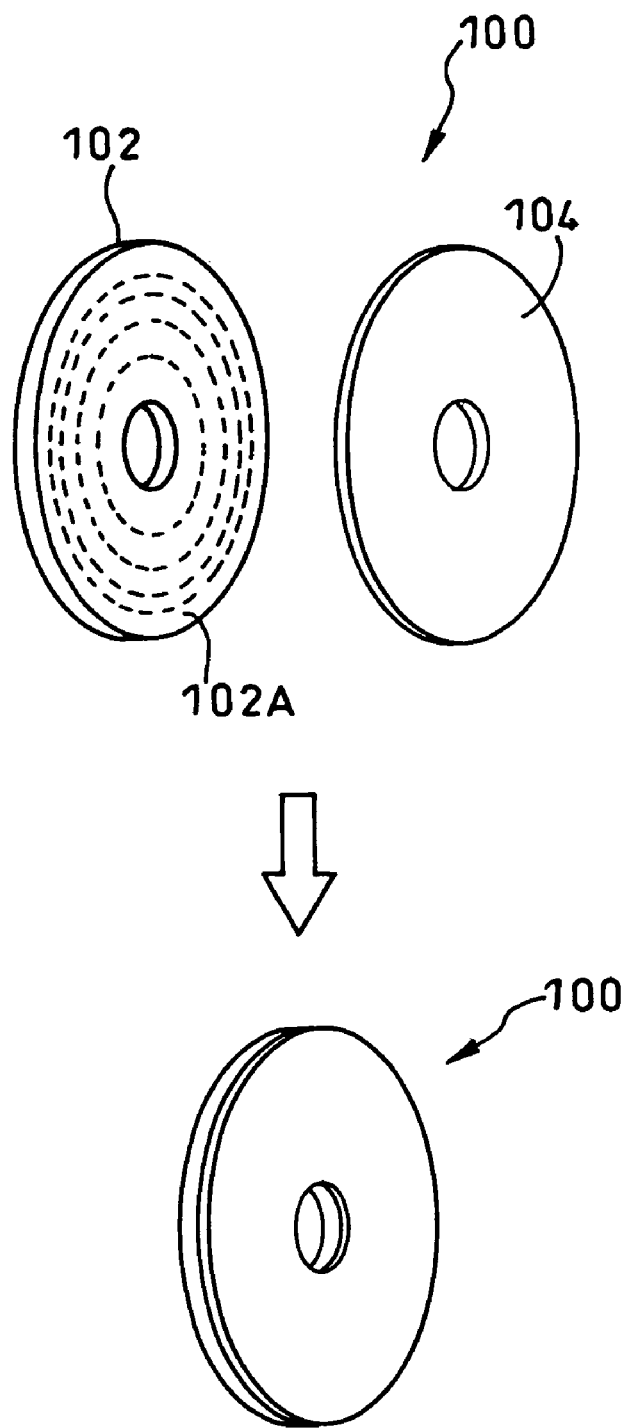
FIG. 18 is a perspective view showing a structure of a conventional optical recording medium.
Figure 19:
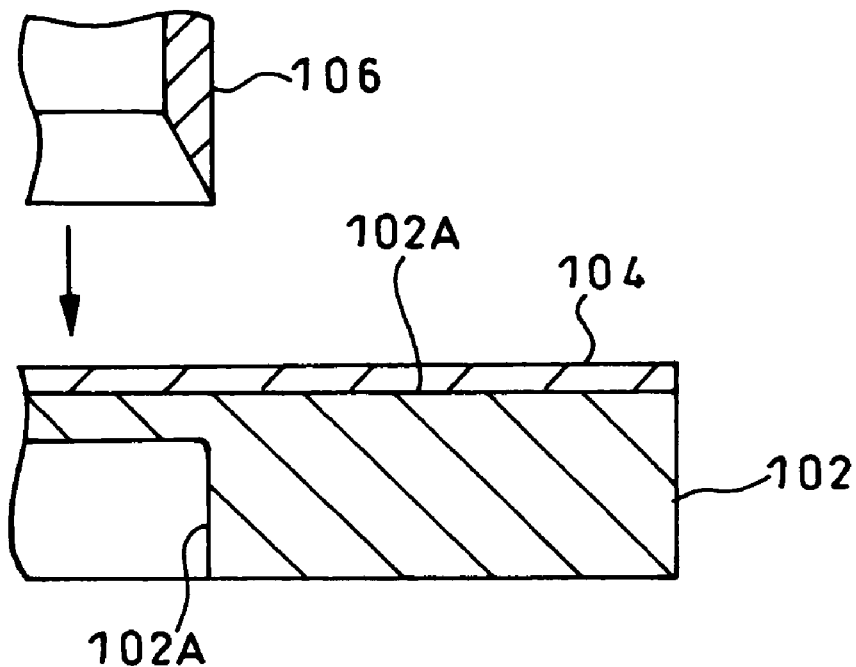
FIG. 19 is a sectional view showing a punching step of the optical recording medium.
Figure 20:
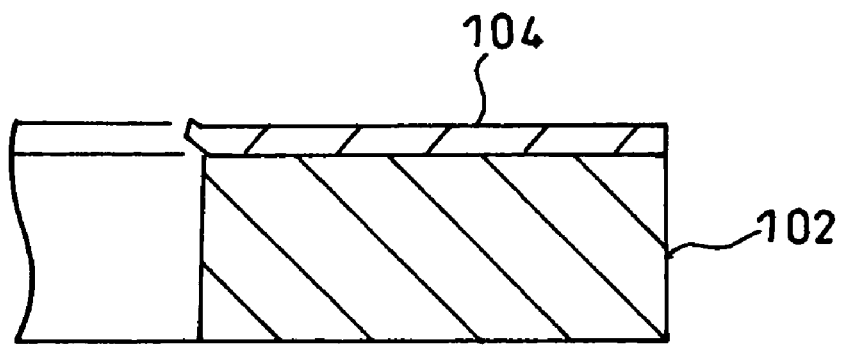
FIG. 20 is a sectional view showing a burr generated on an inner periphery of a light transmitting layer by the punching step.

Although the center hole is formed by punching the optical recording medium by the punching tool from the light transmitting layer side to the substrate side at the punching step in the above-described first to third exemplary embodiments, the present invention is not limited thereto. When the force in a direction of stripping from the information recording face, which is exerted on the light transmitting layer by punching, is small such as in the case where a depth of the cut is sufficient, the center hole may also be formed by punching the optical recording medium from the substrate 12 (42) side to the light transmitting layer 14 (44) side as shown in FIG. 17. On the other hand, when the force in the direction of separating from the information recording face, which is exerted on the light transmitting layer by punching, is large such as in the case where the depth of the cut is small, it is preferred to form the center hole by punching the optical recording medium from the light transmitting layer side to the substrate side by the punching tool as in the first to third exemplary embodiments described above.

Although the circular concave portions 12B and 42B are formed on the substrates 12 and 42 at the molding step, respectively, in the first to third exemplary embodiments described above, the present invention is not limited thereto. In the case where the substrates 12 and 42 are easy to punch, the substrate may be formed in a disc-like shape without a circular concave portion so as to be then punched.

Although the amount of projection of the annular protrusion 48 is 0.1 mm, which is equal to the thickness of the light transmitting layer 44, in the third exemplary embodiment described above, the present invention is not limited thereto. The amount of projection of the annular protrusion 44 may be set larger than the thickness of the light transmitting layer 44. In this manner, if a plurality of the optical recording media 40 are piled up or the optical recording medium 40 is placed on a table or the like, the light transmitting layer 44 can be prevented from coming into contact with another optical recording medium, the table or the like. Accordingly, the light transmitting layer 44 can be protected. If the optical recording medium 40 is slightly inclined, the light transmitting layer 44 may come into contact with another optical recording medium or the like. Even in this case, a contact pressure can be reduced. Thus, certain effects of protecting the light transmitting layer 44 can be expected.

Even if the amount of projection of the annular protrusion 44 is smaller than the thickness of the light transmitting layer 44, certain effects that the annular protrusion 44 protects the inner periphery of the light transmitting layer 44 against a finger, a positioning component or the like can be obtained.

INDUSTRIAL APPLICABILITY

As described above, according to the present invention, excellent effects of allowing a center hole to be formed without generating any burrs or stripping on the inner periphery of a light transmitting layer and the light transmitting layer to be formed at a uniform thickness on a substrate are produced.

The invention claimed is:

1. A method for manufacturing an optical recording medium, comprising:
    a molding step of molding a disc-like shaped substrate including an information recording face at least on one side;
    a light transmitting layer formation step of forming a light transmitting layer thinner than the substrate on the information recording face;
    a cutting step of forming a circular cut in the light transmitting layer; and
    a punching step of punching out at least a part of an area inside the circular cut by a punching tool to divide the light transmitting layer at the circular cut and form both center holes in the light transmitting layer and the substrate, wherein
    the circular cut in the light transmitting layer is formed at a larger diameter than an inner diameter of the center hole in the substrate,
    the area inside the circular cut is pressurized in a thickness direction by the punching tool to divide the light transmitting layer at the circular cut and to punch the light transmitting layer and the substrate, thereby forming the center hole at a larger inner diameter than that of the center hole in the substrate in the light transmitting layer, and
    the molding step, the light transmitting layer formation step, the cutting step and the punching step are conducted in this order.

2. The method for manufacturing an optical recording medium according to claim 1, wherein
    a circular protrusion at a larger outer diameter than the inner diameter of the center hole in the substrate is formed on the information recording face at the molding step, the cut is formed in the light transmitting layer along an outer side of an outer circumference of the circular protrusion, and the substrate is punched by the punching tool to leave an outer periphery of the circular protrusion to form an annular protrusion around the center hole in the substrate as well as to form the center hole having a larger inner diameter than an outer diameter of the annular protrusion in the light transmitting layer.

3. The method for manufacturing an optical recording medium according to claim 1, wherein
    a resin having fluidity is supplied to the vicinity of a center of the substrate while the substrate is rotated to allow the resin to flow outward in a radial direction by centrifugal force for spread, thereby forming the light transmitting layer at the light transmitting layer formation step.

4. The method for manufacturing an optical recording medium according to claim 2, wherein
    a resin having fluidity is supplied to the vicinity of a center of the substrate while the substrate is rotated to allow the resin to flow outward in a radial direction by centrifugal force for spread, thereby forming the light transmitting layer at the light transmitting layer formation step.

5. The method for manufacturing an optical recording medium according to claim 3, wherein
    the light transmitting layer is made of a radiation curable resin, a radiation ray is radiated so that the light transmitting layer is semi-cured at the light transmitting layer formation step, and a reirradiation step of radiating a radiation ray again to the semi-cured light transmitting layer so as to completely cure the light transmitting layer is provided after the cutting step.

6. The method for manufacturing an optical recording medium according to claim 4, wherein
    the light transmitting layer is made of a radiation curable resin, a radiation ray is radiated so that the light transmitting layer is semi-cured at the light transmitting layer formation step, and a reirradiation step of radiating a radiation ray again to the semi-cured light transmitting layer so as to completely cure the light transmitting layer is provided after the cutting step.

7. A manufacturing device of an optical recording medium, comprising:

a cutting device for forming a circular cut in a light transmitting layer of a semifinished product of an optical recording medium, the optical recording medium including a disc-like shaped substrate having an information recording face at least on one side and the light transmitting layer thinner than the substrate on the information recording face; and a punching device for punching out at least a part of an area inside the circular cut by a punching tool to divide the light transmitting layer at the circular cut and form both center holes in the light transmitting layer and the substrate after the circular cut is formed in the light transmitting layer by the cutting device, wherein the cutting device forms the circular cut at a larger diameter than an inner diameter of the center hole in the substrate, and the punching device pressurizes the area inside the circular cut in a thickness direction to divide the light transmitting layer at the circular cut and to punch the light transmitting layer and the substrate, thereby forming the center hole at a larger inner diameter than that of the center hole in the substrate in the light transmitting layer.

8. A method for manufacturing an optical recording medium, comprising:

a molding step of molding a disc-like shaped substrate including an information recording face at least on one side;

a light transmitting layer formation step of forming a light transmitting layer thinner than the substrate on the information recording face;

a cutting step of forming a circular cut in the light transmitting layer; and a punching step of punching out at least a part of an area inside the circular cut by a punching tool to form center holes in the light transmitting layer and the substrate, wherein the circular cut in the light transmitting layer is formed at a larger diameter than an inner diameter of the center hole in the substrate, and the area inside the circular cut is pressurized in a thickness direction by the punching tool to divide the light transmitting layer at the circular cut and to punch the light transmitting layer and the substrate, thereby forming the center hole at a larger inner diameter than that of the center hole in the substrate in the light transmitting layer.

9. A manufacturing device of an optical recording medium, comprising:

a cutting device for forming a circular cut in a light transmitting layer of a semifinished product of an optical recording medium, the optical recording medium including a disc-like shaped substrate having an information recording face at least on one side and the light transmitting layer thinner than the substrate on the information recording face; and a punching device for punching out at least a part of an area inside the circular cut by a punching tool to form center holes in the light transmitting layer and the substrate, wherein the cutting device forms the circular cut at a larger diameter than an inner diameter of the center hole in the substrate, and the punching device pressurizes the area inside the circular cut in a thickness direction to divide the light transmitting layer at the circular cut and to punch the light transmitting layer and the substrate, thereby forming the center hole at a larger inner diameter than that of the center hole in the substrate in the light transmitting layer.

* * * * *

UNITED STATES PATENT AND TRADEMARK OFFICE
CERTIFICATE OF CORRECTION

| | | |
|---|---|---|
| PATENT NO. | : 7,680,018 B2 | Page 1 of 1 |
| APPLICATION NO. | : 10/518770 | |
| DATED | : March 16, 2010 | |
| INVENTOR(S) | : Tomoki Ushida et al. | |

It is certified that error appears in the above-identified patent and that said Letters Patent is hereby corrected as shown below:

On the Title Page

Item (75)   Inventors should read: Tomoki Ushida, Tokyo (JP); Mamoru Usami, Tokyo (JP); Kenji YAMAGA, Tokyo (JP)

Signed and Sealed this

Eighteenth Day of May, 2010

David J. Kappos
*Director of the United States Patent and Trademark Office*